(12) United States Patent
Grace et al.

(10) Patent No.: US 9,924,708 B2
(45) Date of Patent: Mar. 27, 2018

(54) THROWABLE GAME CALL DEVICE

(71) Applicant: Toss a Call, LLC, Eldon, MO (US)

(72) Inventors: Kevin D. Grace, Eldon, MO (US); Wendye A. Moreland, Mount Vernon, TX (US); Wayne A. Cox, Mount Vernon, TX (US)

(73) Assignee: Toss A Call, LLC, Eldon, MO (US)

( * ) Notice: Subject to any disclaimer, the term of this patent is extended or adjusted under 35 U.S.C. 154(b) by 262 days.

(21) Appl. No.: 14/848,200

(22) Filed: Sep. 8, 2015

(65) Prior Publication Data

US 2016/0066560 A1 Mar. 10, 2016

Related U.S. Application Data

(60) Provisional application No. 62/047,208, filed on Sep. 8, 2014.

(51) Int. Cl.
*A01M 31/00* (2006.01)

(52) U.S. Cl.
CPC .................. *A01M 31/004* (2013.01)

(58) Field of Classification Search
CPC ......................... A01M 31/004; A01M 2200/00
See application file for complete search history.

(56) References Cited

U.S. PATENT DOCUMENTS

| | | | | |
|---|---|---|---|---|
| 3,599,745 A * | 8/1971 | Hughes | ............... | H01H 29/22 180/284 |
| 4,658,386 A * | 4/1987 | Morris | ............... | A01M 29/18 367/139 |
| 5,369,796 A | 11/1994 | Kung | | |
| 5,563,574 A * | 10/1996 | Hoover | ............... | G08B 1/08 340/384.4 |
| 5,694,054 A | 12/1997 | Ovshinsky et al. | | |
| 7,133,528 B2 | 11/2006 | Stillwell | | |
| 2002/0064094 A1* | 5/2002 | Gaspari | ............... | A01M 31/004 367/139 |
| 2005/0232083 A1* | 10/2005 | Borsina | ............... | A01K 15/02 367/139 |
| 2008/0159079 A1* | 7/2008 | Dir | ............... | A01K 97/125 367/139 |
| 2012/0008464 A1 | 1/2012 | Barley et al. | | |
| 2015/0237847 A1* | 8/2015 | Madl | ............... | A01M 31/004 367/139 |
| 2016/0066560 A1* | 3/2016 | Grace | ............... | A01M 31/004 367/139 |

FOREIGN PATENT DOCUMENTS

WO 2014060647 4/2014

* cited by examiner

*Primary Examiner* — Daniel Pihulic
(74) *Attorney, Agent, or Firm* — Law Office of Mark Brown, LLC; Mark E. Brown

(57) ABSTRACT

A game call device which can be tossed from a concealed position. A preferred embodiment includes a flat bottom surface which is weighted such that the device will land against that face. A button located within the flat bottom surface activates the device, turning on a speaker which plays a sound. The sound will typically be the sound of a prey animal, intended to draw a predator animal to the device. Because the device is tossed from a concealed location, the device can be deployed without the user being forced to physically disturb the area where the call is placed, thereby decreasing the likelihood of being detected by the animal.

11 Claims, 6 Drawing Sheets

THROWABLE GAME CALL DEVICE

CROSS-REFERENCE TO RELATED APPLICATION

This application claims the benefit of U.S. Provisional Patent Application No. 62/047,208, filed Sep. 8, 2014, which is incorporated herein by reference.

BACKGROUND OF THE INVENTION

1. Field of the Invention

The present disclosed technology relates generally to game calls, and in particular to a throwable game call device.

2. Description of the Related Art

Standard hunting lures require the hunter or observer to manually place the lure in an area and to activate the lure or otherwise move into the area where the lure is placed. This requires the hunter to disturb the surroundings around the lure, including leaving their scent behind in the vicinity.

What is needed is a hunting lure for animals, particularly for predators, which can be used without requiring the surrounding area to be physically disturbed by the user.

Heretofore there has not been available a throwable game call device with the advantages and features of the disclosed subject matter.

SUMMARY OF THE INVENTION

The present invention generally provides a game call device which can be tossed from a concealed position. The device includes a flat bottom surface which is weighted such that the device will land against that face. A button located within the flat bottom surface activates the device, turning on a speaker which plays a sound. The sound will typically be the sound of a prey animal, intended to draw a predator animal to the device. Because the device is tossed from a concealed location, the device can be deployed without the user being forced to physically disturb the area where the call is placed, thereby decreasing the likelihood of being detected by the animal.

BRIEF DESCRIPTION OF THE DRAWINGS

The drawings constitute a part of this specification and include exemplary embodiments of the invention illustrating various objects and features thereof, wherein like references are generally numbered alike in the several views.

DETAILED DESCRIPTION OF THE PREFERRED EMBODIMENTS

I. Introduction and Environment

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning II. Preferred Embodiment Hands-Free Electronic Predator Call 2

As shown in FIGS. 1-4, the present invention is a hands-free electronic predator call 2. A hunter would simply toss or throw the throwable game call device 2 to a desired location and watch the predators as they approach the cries of their prey.

The hunter's presence is concealed, as the throwable game call device leaves no traceable scent, and the hunting site is left undisturbed. The throwable game call device falsifies the location of the hunter, granting greater access to take down his or her predator.

The throwable game call device is discretely designed to use the "sneak attack" technique. By this, the throwable game call device is tossed or thrown to a desired distance from the hunter's location. The game call device then plays the outcries of the chosen predator's prey through the included speaker system 24, luring the predator closer, enabling the hunter to covertly make the kill.

Figure 1:
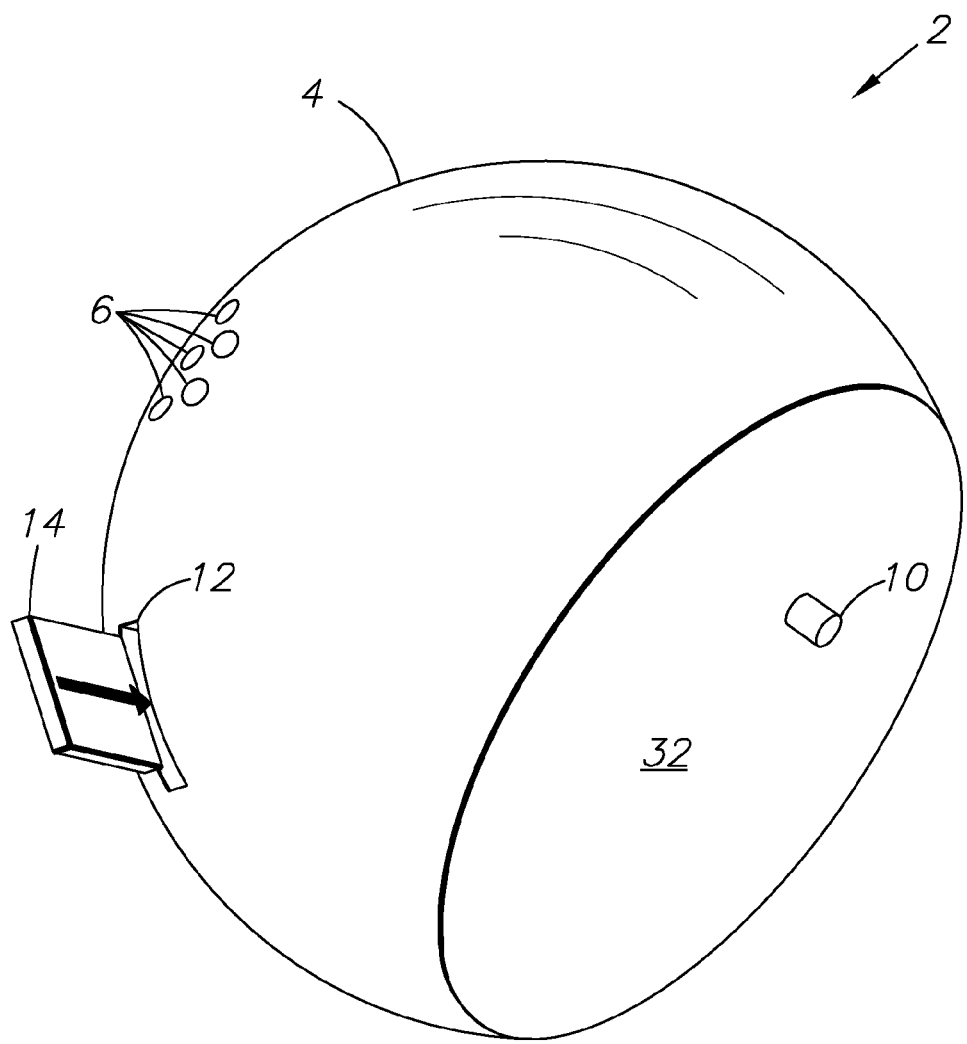
FIG. 1 is a three-dimensional isometric view of a preferred embodiment of the present invention.
Figure 2:
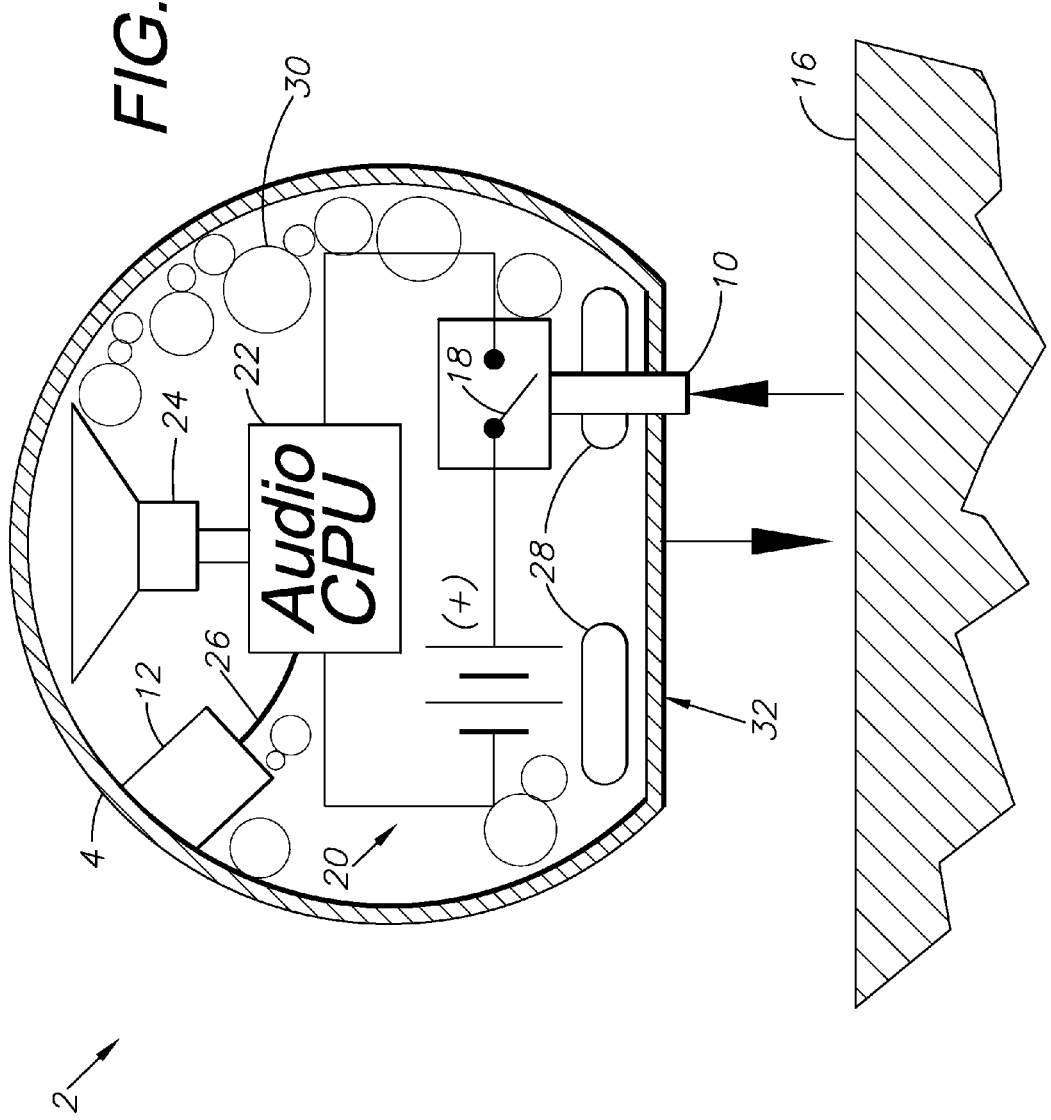
FIG. 2 is a side, schematic diagram thereof, the embodiment being positioned over a ground surface.
Figure 3:
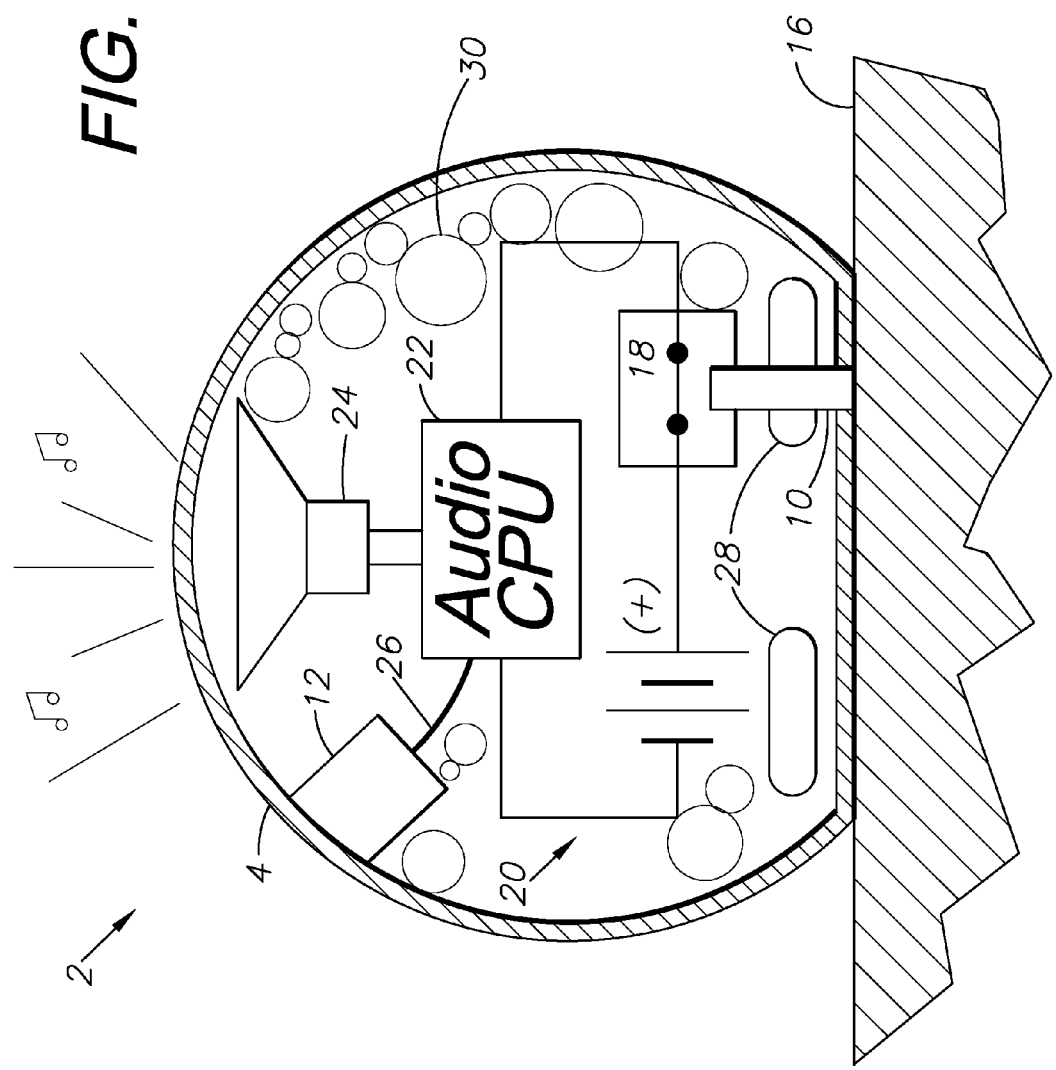
FIG. 3 is a side, schematic diagram thereof, showing the embodiment in contact with the ground surface.
Figure 4:
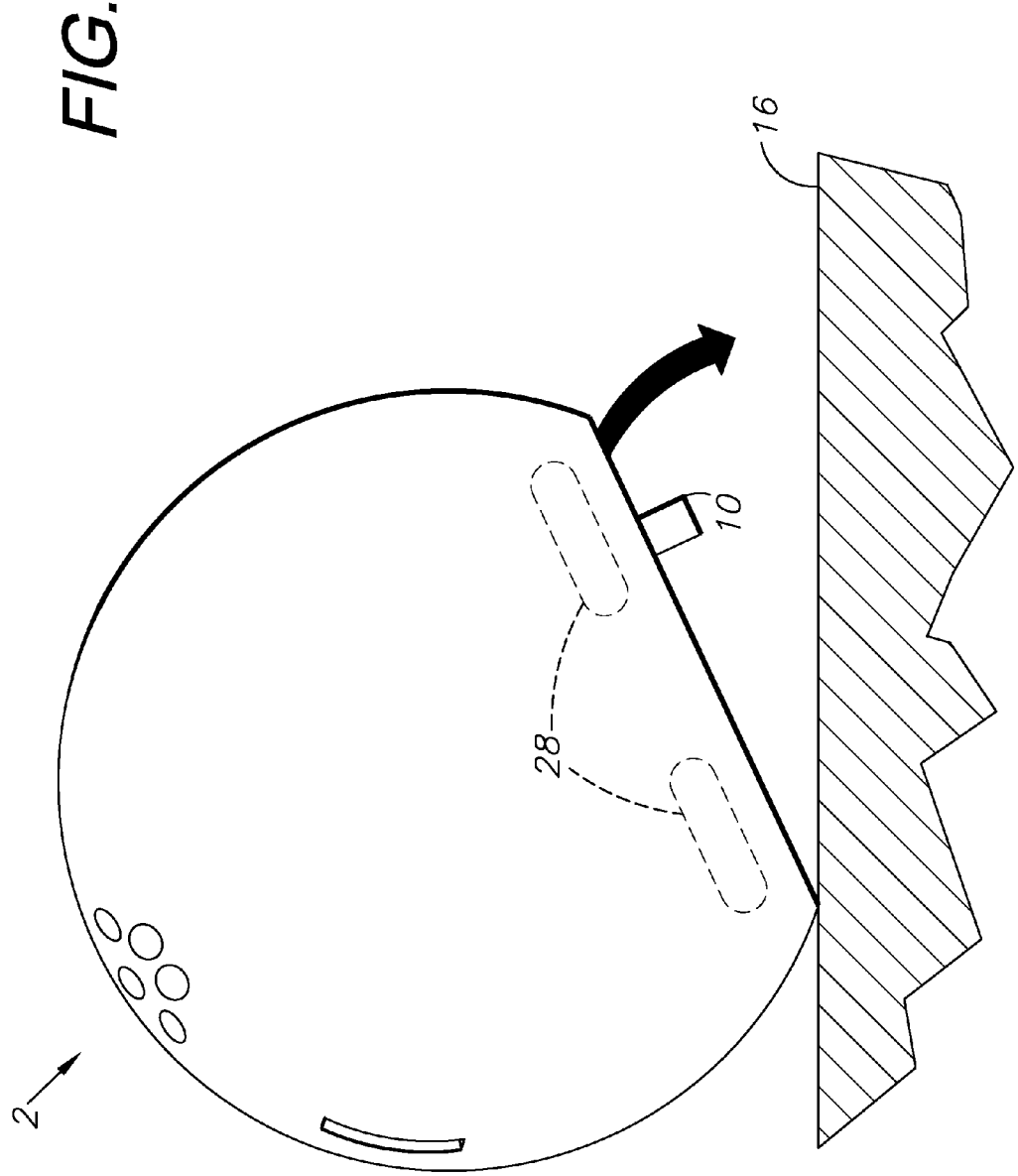
FIG. 4 is a side elevational view thereof, demonstrating the effects of weights within the embodiment.

The throwable game call device is a rubber ball, composed of a micro amplified rechargeable speaker system 24, an MP3 player computer 22 which is rechargeable and can attain numerous sounds and calls (determined by the amount of removable data storage used). Expandable foam 30, or other suitable material, encases and protects the electronics which are located inside the ball, including the MP3 computer 22, circuits 20, switch 18, and speaker 24. Hook-and-loop fastening strips could secure the accessibility to the controls. The animal sounds are downloaded and stored onto the removable data storage 14, such as a solid-state disk (SD) micro storage chip, which is then connected to the MP3 computer via a receiver slot 12 and connection 26. The MP3 computer 22 connects to the speaker 24 which will then project the sounds or cries through the included speaker system through speaker holes 6 located in the housing 4 of the call 2. The speaker system is counter-weighted via weights 28, ensuring the speaker system remains in upright position inside the ball to ensure optimal amplification of the recorded sounds or calls. The base 32 of the call 2 is flat to enhance the ability of the call to land upright when tossed as shown in FIG. 4. When the call hits the ground 16, the button 10 presses the switch 18 and activates the MP3 computer 22 and speaker 24.

The throwable game call device may be used to aid in hunting any desired game animal, and will be targeted towards hunters, outdoorsmen, and all animal enthusiasts. The device could be market in sporting goods stores and any major retail stores which offer hunting paraphernalia.

III. Alternative Embodiment Predator Call 52

Figure 5:
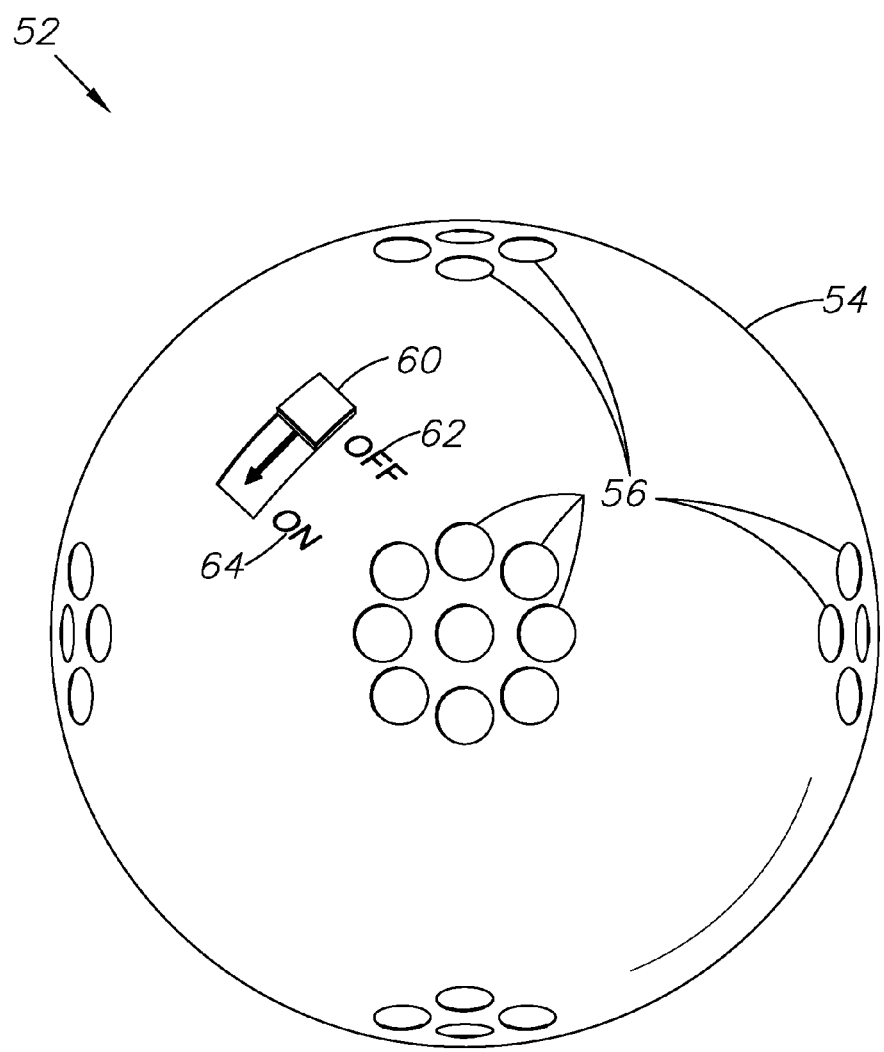
FIG. 5 is a three-dimensional isometric view of an alternative embodiment of the present invention.

FIG. 5 shows an alternative embodiment predator call 52. Most of the components are identical to the embodiment described above. Unlike the previous version which intended to land upright, this version includes several groups of speaker holes 56 through the housing 54 pointing in many directions, allowing the sounds to escape the call no matter how the call lands when thrown. A switch 60 including an off 62 and on 64 position allows the user to activate the call prior to tossing the call, rather than risk the chance that the call will not land on the button, thereby activating the call.

IV. Alternative Embodiment Predator Call 102

Figure 6:
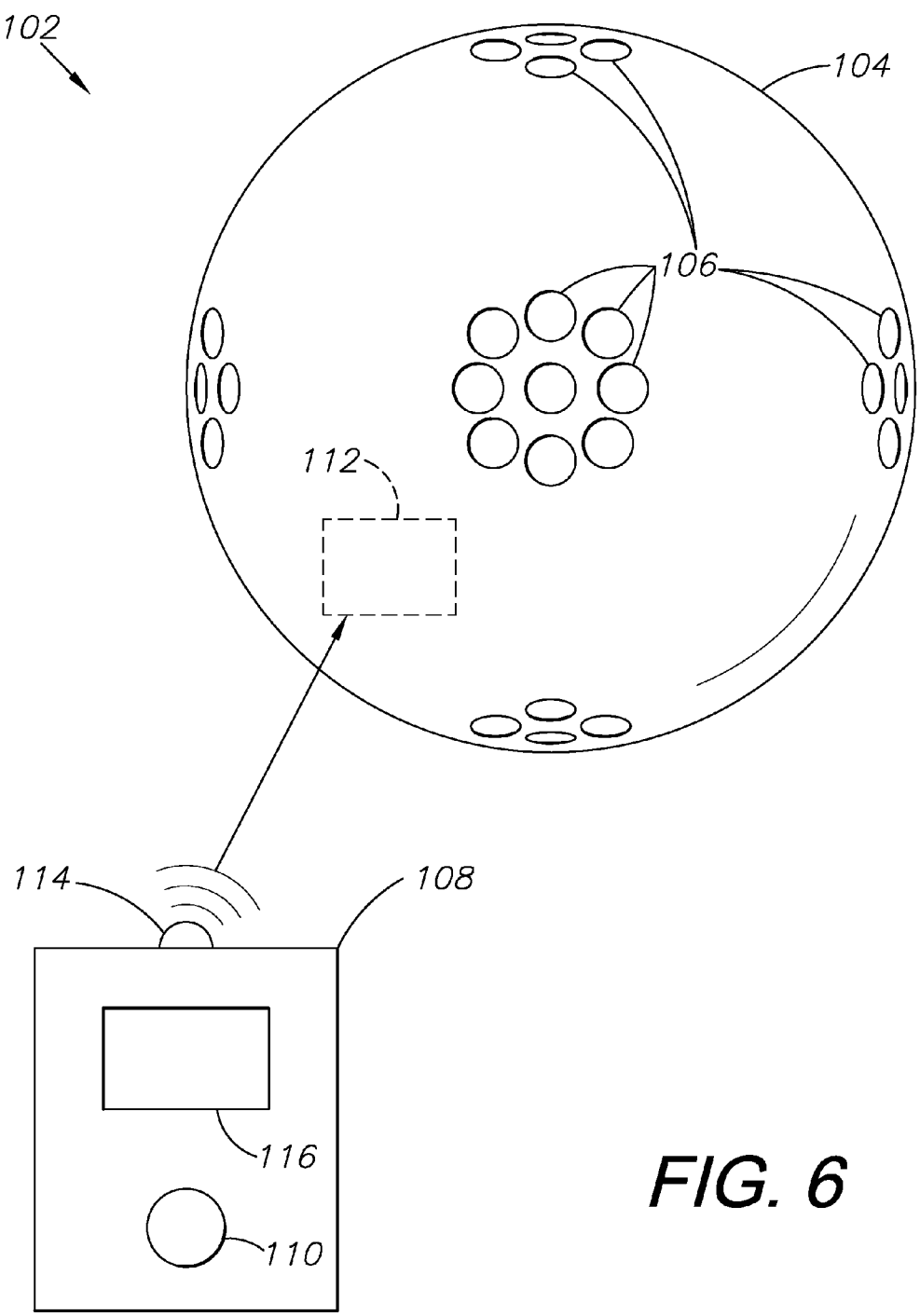
FIG. 6 is a three-dimensional isometric view of yet another alternative embodiment of the present invention.

FIG. 6 shows another alternative embodiment predator call 102 which again includes several groups of speaker holes 106 through the housing 104 pointing in many directions, allowing the sounds to escape the call no matter how the call lands when thrown. A remote control 108 communicates to a receiver 112 located within the call 102 via a transmitter 114. A switch 110 turns the call on or off. Again, the internal components are similar to those in the embodiments disclosed above. An optional graphical user interface (GUI) 116, which may be a touchscreen display or otherwise interactive display, may allow the user to switch between sounds stored on the internal memory of the call 102.

It is to be understood that while certain embodiments and/or aspects of the invention have been shown and described, the invention is not limited thereto and encompasses various other embodiments and aspects.

The invention claimed is:

1. A game call comprising:
    a microprocessor configured to be activated by a switch, said microprocessor further configured to activate a speaker;
    digital memory configured to store audio data readable by said microprocessor and playable by said speaker;
    a power source configured to provide electrical power to said microprocessor and said speaker;
    a housing having an interior space and an exterior face, said housing interior space containing said speaker, said microprocessor, said power source, and said switch;
    expandable foam placed within the interior space of said housing, said expandable foam configured to encase and protect said microprocessor, said speaker, and said power source;
    said housing having a generally spherical shape;
    a button protruding through said housing, said button configured to trigger said switch;
    a weight located within the interior space of said housing, said weight configured to cause said game call to land in proximity to said button, thereby depressing said button; and
    said housing configured to be tossed.

2. The game call of claim 1, further comprising:
    said housing including a single flat bottom face;
    said button protruding through said single flat bottom face; and
    said weight configured to cause said game call to land on said flat bottom face when tossed.

3. The game call of claim 1, further comprising:
    said housing having a generally spherical shape; and
    a trigger having an on position and an off position located on said exterior face of said housing, said trigger configured to activate and deactivate said switch.

4. The game call of claim 1, further comprising:
    a wireless receiver located within said interior space of said housing, said wireless receiver configured to activate said switch upon receiving a wireless signal; and
    a wireless remote including a wireless transmitter located remotely from said game call, said wireless remote including a trigger configured to activate and deactivate said switch.

5. The game call of claim 4, further comprising:
    a graphical user interface (GUI) located on said wireless remote, said GUI indicating an on or off status of said game call.

6. The game call of claim 1, further comprising:
    a receiver slot within said housing, said receiver slot configured to receive said digital memory and to communicate said digital memory with said microprocessor.

7. The game call of claim 6, wherein said digital memory is a secure digital (SD) memory card, said memory card being removable from said game call receiver slot.

8. The game call of claim 6, further comprising:
    digital sound files stored on said digital memory, said digital sound files readable by said microprocessor; and
    said digital sound files configured to be added or removed to said digital memory by a remote computing device.

9. The game call of claim 6, wherein said digital sound files include recorded prey animal sounds.

10. A method of using a game call comprising:
    loading digital sound files onto a removable digital memory device using a remote computing device;
    placing said digital memory device into a receiver slot located in a housing of a game call;
    reading said digital sound files with a microprocessor located within said game call;
    throwing said game call;
    triggering a switch within said game call upon said game call coming into contact with a ground surface, whereby said housing is generally spherical and includes a weight and whereby said weight causes a button to become depressed, hereby triggering said switch; and
    playing said digital sound files through a speaker connected to said microprocessor and a power source within said housing.

11. The method of claim 10, wherein said digital sound files include recorded prey animal sounds.

* * * * *